(12) United States Patent
Fahrländer et al.

(10) Patent No.: US 11,879,074 B2
(45) Date of Patent: Jan. 23, 2024

(54) BLISTER PACK CONTAINING A SHAPED ADHESIVE, COATING MATERIAL OR SEALANT ARTICLE

(71) Applicant: KLEBCHEMIE M. G. BECKER GMBH & CO. KG, Weingarten/Baden (DE)

(72) Inventors: Michael Fahrländer, Stutensee (DE); Tobias Ficht, Bretten (DE); Uwe Heuser, Karlsruhe (DE); Walter Höhn, Aichtal (DE)

(73) Assignee: KLEIBERIT SE & CO. KG, Weingarten (DE)

( * ) Notice: Subject to any disclaimer, the term of this patent is extended or adjusted under 35 U.S.C. 154(b) by 794 days.

(21) Appl. No.: 16/975,510

(22) PCT Filed: Mar. 7, 2019

(86) PCT No.: PCT/EP2019/055681
§ 371 (c)(1),
(2) Date: Aug. 25, 2020

(87) PCT Pub. No.: WO2019/179780
PCT Pub. Date: Sep. 26, 2019

(65) Prior Publication Data
US 2021/0032511 A1    Feb. 4, 2021

(30) Foreign Application Priority Data
Mar. 19, 2018  (DE) .................. 20 2018 001 436.2

(51) Int. Cl.
B65D 75/36    (2006.01)
C09J 133/08   (2006.01)
(Continued)

(52) U.S. Cl.
CPC .............. *C09J 133/08* (2013.01); *B65B 1/04* (2013.01); *B65B 7/2878* (2013.01);
(Continued)

(58) Field of Classification Search
CPC ...... B65D 75/36; B65D 75/34; B65D 75/366; B65D 75/367; B65D 2575/36;
(Continued)

(56) References Cited

U.S. PATENT DOCUMENTS 3,278,656 A * 10/1966 Dicks ....................... B05B 5/08
                                                    428/218
4,341,302 A    7/1982 Baker et al.
(Continued)

FOREIGN PATENT DOCUMENTS

CN      103289631 B    12/2014
WO   WO 2006/106143 A1  10/2006
(Continued)

OTHER PUBLICATIONS

International Preliminary Report on Patentability for International Application No. PCT/EP2019/055681, dated Sep. 24, 2020.
(Continued)

*Primary Examiner* — Javier A Pagan
(74) *Attorney, Agent, or Firm* — Birch, Stewart, Kolasch & Birch, LLP

(57) ABSTRACT

The present invention relates to a blister pack (1) filled with a shaped adhesive, coating or sealant article that is solid at room temperature, said pack (1) having a shaped plastic film part (2), which has at least one cavity (3), and a lidding film (4), wherein the at least one cavity (3) has a filling volume
(Continued)

with adhesive, coating material or sealant in the range from 5 ml to 500 ml, and the lidding film (4) closes the cavity (3). The invention further relates to a method for producing the blister pack.

23 Claims, 1 Drawing Sheet

(51) Int. Cl.
    *B65B 1/04*     (2006.01)
    *B65B 7/28*     (2006.01)
    *B65D 75/32*     (2006.01)
    *C09D 133/08*     (2006.01)
    *C09D 175/04*     (2006.01)
    *C09J 175/04*     (2006.01)

(52) U.S. Cl.
    CPC ........... *B65D 75/326* (2013.01); *B65D 75/36* (2013.01); *C09D 133/08* (2013.01); *C09D 175/04* (2013.01); *C09J 175/04* (2013.01); *B65D 2575/36* (2013.01)

(58) Field of Classification Search
    CPC ........ B65D 2575/365; B65D 2075/362; B65D 2075/363; B65D 2075/365
    See application file for complete search history.

(56) References Cited

U.S. PATENT DOCUMENTS

| | | | |
|---|---|---|---|
| 4,748,796 A * | 6/1988 | Viel | B65B 1/04 |
| | | | 156/289 |
| 7,326,042 B2 * | 2/2008 | Alper | B65B 63/08 |
| | | | 425/127 |
| 2009/0022984 A1 * | 1/2009 | Ehrmann | C08G 18/672 |
| | | | 428/339 |
| 2009/0082485 A1 | 3/2009 | Slark et al. | |

FOREIGN PATENT DOCUMENTS

| | | | | |
|---|---|---|---|---|
| WO | WO 2014/074599 A1 | | 5/2014 | |
| WO | WO-2014074599 A1 * | | 5/2014 | ........... B08B 7/0028 |

OTHER PUBLICATIONS

International Preliminary Report on Patentability, issued in PCT/EP2019/055681, dated Jun. 16, 2020.
International Search Report, issued in PCT/EP2019/055681, dated Jun. 4, 2019.
Written Opinion of the International Searching Authority, issued in PCT/EP2019/055681, dated Jun. 4, 2019.

* cited by examiner

BLISTER PACK CONTAINING A SHAPED ADHESIVE, COATING MATERIAL OR SEALANT ARTICLE

The present invention relates to a blister pack filled with a shaped adhesive, coating and sealant article and also to a method for producing said pack.

Thermoplastic adhesives, coatings and sealants are used in numerous craft, trade and industrial applications in, for example, the wood and furniture industries, the automobile industry, the textile industry or the packing industry, in the form of granules. Advantages of thermoplastic adhesives, coatings and sealants in granule form are that they are easy to handle and easy to dose and that they meet the majority of requirements in terms, for example, of heat resistance. These granules are usually introduced directly into melt tanks in which they are melted, or are melted via a premelter.

Where the adhesives are subject to more exacting requirements, in relation, for example, to their moisture or heat distortion resistance, it is often no longer sufficient to use thermoplastic adhesive, coatings and sealants. In such an event, therefore, recourse is had to reactive adhesives, coatings and sealants, which crosslink either by means of atmospheric moisture, thermally or under UV light. Usually, however, such reactive adhesives must be protected by suitable packing from atmospheric moisture and/or from UV light.

These kinds of reactive adhesives, coatings and sealants are customarily available commercially in pack sizes of 2 kg-200 kg. For users consuming smaller amounts, such as joiners, for example, there would be interest, however, in smaller pack forms, since, when larger packs are used, the adhesive may become altered as a result of the consequently long dwell time in the melting apparatus, and may possibly have to be disposed of.

One such application with comparatively low quantities consumed is the gluing, for example, of edging materials onto furniture panels in joineries. After the large-format panels, which are usually bought in, have been sawn to the correct dimensions, they have a cut edge. To finish off the cut piece of wood, edging materials, usually from the roll, are glued on using hotmelt adhesives by means of edge gluing machines.

For the processing of hotmelt adhesives based, for example, on EVA or polyolefin granules, edge gluing machines usually have a premelter available. This premelter supplies a melt tank, from which the adhesive is taken for application to the substrate.

If the furniture is being placed in an environment with relatively high atmospheric humidity, such as in the bathroom or the kitchen, for example, the adhesives used are preferably reactive polyurethane hotmelt adhesives. After curing by means of atmospheric moisture, these adhesives are notable for relatively high heat distortion resistance and also insensitivity to moisture. Reactive polyurethane hotmelt adhesives are processed on edge gluing machines, usually with the aid of a separate premelter. Adhesive candles with an approximate diameter of 125 mm and a weight of around 2 kg are used. As for the processing of EVA or polyolefin granules, the PU premelter supplies the melt tank.

In practice it has emerged that pack sizes of reactive polyurethane hotmelt adhesives of 2 kg are economically feasible only for users whose consumption is high. In order to offer a solution equally to users—for example, relatively small joineries—who are processing smaller amounts of reactive polyurethane hotmelt adhesives, reactive polyurethane hotmelt adhesives in granule form were introduced into the market. These polyurethane hotmelt adhesive granules can be input directly into the melt tank in precise portions. The polyurethane hotmelt adhesive granules are offered in standard commercial amounts from tin cans holding around 1 kg.

A disadvantage associated with moisture-reactive polyurethane hotmelt adhesives in granule form is their high surface area and the associated increase in reactivity toward atmospheric moisture, with the possible consequence that the adhesives may react with atmospheric moisture even before their actual use, given that the usual pack form of 1 kg is opened a number of times before it is completely used up. Polyurethane hotmelt adhesives of this kind which have already undergone preliminary crosslinking can no longer be brought into a liquid melt state, and are therefore no longer suitable for processing. Moreover, polyurethane hotmelt adhesive granules are costly and inconvenient to produce, since during the production of the granules they absolutely must be protected from atmospheric moisture, to prevent the granules reacting during the production process itself.

It was an object of the present invention, therefore, to provide preferably reactive adhesives, sealants and coatings in an economic pack size suitable for preferably relatively low-volume consumers.

The object is achieved by means of a blister pack filled with a shaped adhesive, coating or sealant article that is solid at room temperature, said pack having a shaped plastic film part, which has at least one cavity, and a lidding film, wherein the at least one cavity has a filling volume with adhesive, coating material or sealant in the range from 5 ml to 500 ml, preferably from 10 ml to 100 ml, and the lidding film closes the cavity.

A further subject of the present invention is a method for producing a blister pack of the invention, comprising the steps of
 (a) filling at least one cavity of a shaped plastic film part with an adhesive, coating material or sealant which is solid at room temperature, and
 (b) joining the shaped plastic film part to a lidding film in order to close the at least one cavity.

As a result it is possible for adhesives, sealants and coating materials to be dispensed in the appropriate portion, and for the disadvantages stated above to be avoided at least in part. Surprisingly, the withdrawal of these shaped articles of adhesive, sealant and coating materials is readily possible, even when they are introduced into the cavity in the hot liquid state and then solidify into the shaped article at least at room temperature.

The term "blister" or "blister pack" is sometimes designated as sight packaging, so that at least the shaped part having the cavity is see-through to the outside. In the context of the present invention, however, the term "blister" or "blister pack" should not be understood as imposing any limitation. Instead, the term "blister" or "blister pack" also embraces embodiments in which there is only partial transparency or nontransparency.

The shaped plastic film part can be produced from what is called a bottom film, by introduction of cavities. After the shaped plastic film part has been filled with the preferably reactive adhesives, sealants and coating materials, the shaped plastic film part is joined firmly to the lidding film, preferably by welding or adhesive bonding.

Accordingly, a preferred subject of the present invention is a blister pack wherein the adhesive, the coating material or the sealant is a reactive adhesive, a reactive coating material or a reactive sealant. The reactive adhesive, the reactive coating material or the reactive sealant is preferably crosslinkable by means of atmospheric moisture, thermally and/or under UV light. It is further preferred for the adhesive, the coating material or the sealant to be a moisture-reactive polyurethane hotmelt adhesive, a moisture-reactive polyolefin hotmelt adhesive, a UV-curable, acrylate-based hotmelt adhesive or a dual-cure hotmelt adhesive. Hotmelt adhesives of these kinds are suitable not only for bonding but also for sealing or coating and in the prior art and also in the context of the present invention are referred to for simplicity as "adhesive", even if they serve as coating material or sealant.

The cavities are preferably introduced into the bottom films by cold forming. Another means of introducing cavities into bottom films is that of thermoforming. Here, the cavities are introduced into the bottom films after prior heating.

A blister pack according to the present invention may have one or more cavities. Preferably it contains only one cavity. The cavity or cavities in each case are occupied by a shaped adhesive, coating or sealant article.

Especially preferred as bottom films are composite films having a polyamide/aluminum/polypropylene construction. The aluminum layer present acts as a barrier to water vapor (WVTR: ≤0.01 g/m²×d @ 25° C./100% r.h.) and oxygen (OTR: ≤0.005 cm³/m²×d @ 25° C./50% r.h.). Other sealable laminate types or monofilms as well, possessing good barrier properties, such as metalized films or $SiO_x$- or $AlO_x$-coated films, are used preferably as bottom film. The monofilms or composite films suitable as bottom films have a total thickness of preferably 20 μm to 500 μm, more preferably 50 μm to 300 μm.

In one preferred embodiment, accordingly, the shaped plastic film part is formed from a composite film which has at least one plastics layer. The composite film advantageously comprises an aluminum layer, and preferably the composite film comprises layers of polyamide/aluminum/polypropylene, especially preferably such that the polypropylene layer constitutes the inside layer and the polyamide plastic layer constitutes the outside layer.

The composite film may have further layers, especially to promote adhesion. Hence it is possible to use adhesives, such as polyurethane adhesive, and optionally primers, in order to obtain the composite film. Examples of commercially available products are Formpack® cold-form laminates from the companies Amcor Flexibles Singen GmbH or Amcor Flexibles Kreuzlingen AG.

As already observed above, it is preferred for the shaped plastic film part to have a cavity wall having a thickness in the range from 20 μm to 500 μm, preferably 50 μm to 300 μm.

The filling of the shaped plastic film parts takes place with exclusion of atmospheric oxygen and also the atmospheric moisture it contains. For this purpose, an inert environment is created. Use is made particularly of preferred inert gases such as argon or nitrogen. It is also possible with preference to use dried air.

The filling of the cavity is carried out at temperatures between 80 and 180° C., preferably at temperatures between 120 and 160° C., in other words at temperatures at which the adhesive, the sealant and/or the coating material are flowable and hence are able to fill the cavity completely.

It is therefore also preferred for the shaped adhesive, coating or sealant article to be adapted to the shape of the cavity. In general, therefore, the shaped adhesive, coating or sealant article can have the shape of a spherical slice, a hemisphere, a spherical segment, a hemiellipsoid or a half-cylinder or of a half-cylinder rounded off at the ends on both sides.

It is preferred accordingly for the shaped adhesive, coating or sealant article to have a melting or softening point of above 40° C. It is preferred additionally for the adhesive, coating material or the sealant to have a viscosity of 2000 to 200 000 mPas by the Brookfield method at not less than one temperature in a temperature range from 80° C. to 180° C. It is not necessary here for a particular viscosity to be maintained over the whole of the temperature range.

It is additionally preferred for the at least one cavity to have a volume of which at least 50%, more preferably at least 60%, more preferably at least 70%, more preferably at least 80%, more particularly at least 90% is occupied by the filling volume with adhesive, coating material or sealant. It is preferred accordingly for at most 50%, more preferably at most 40%, more preferably at most 30%, more preferably at most 20%, more preferably at most 10% of the cavity volume not to be occupied by the shaped article and to contain preferably the inert gas, such as argon or nitrogen, or, preferably, dried air. It is preferable here that the cavity depth may be up to 50 mm.

The welding of the shaped plastic film parts is accomplished with particular preference by means of aluminum lidding foils on which there is preferably an applied heat-sealing varnish (e.g. of polypropylene). Welding is also possible with a polypropylene film which is part of a laminate whose structure is at least aluminum/polypropylene.

Accordingly, in a further preferred embodiment, a blister pack is provided wherein the lidding film constitutes an aluminum foil, a metalized composite film or a sealable, $SiO_x$- or $AlO_x$-coated monofilm, more particularly an aluminum foil. The lidding film may have further layers, such as an outer varnish, based for example on nitrocellulose, or a sealing varnish, such as a heat-sealing varnish, of polypropylene, for example. Accordingly, welding with the shaped plastic film part is possible. Films of these kinds are available commercially, for example, in the form of break-open films, from—for example—the companies Amcor Flexibles Singen GmbH or Amcor Flexibles Kreuzlingen AG.

It is therefore additionally preferred for the shaped plastic film part and the lidding film to be welded by means of a heat-sealing varnish and for the latter to consist preferably of polypropylene.

Laminate types comprising aluminum/polypropylene and also a film composite made up of metalized film or sealable monofilms possessing a coating ($SiO_x$ or $AlO_x$) are likewise used with preference as lidding films. Laminate types or other sealable monofilms which have corresponding barrier properties and can be processed are likewise preferably used. Where the shaped adhesive, coating or sealant article has corresponding sensitivity, the lidding film must have corresponding properties in relation to water vapor and oxygen impermeabilities, corresponding to the composite films which are used preferably as bottom film for producing the cavities.

The lidding film has a thickness preferably of 10 μm to 200 μm, more preferably of 10 μm to 100 μm. Typically, however, the lidding film is thinner than the cavity wall.

As an alternative to the above welding of the lidding film to the shaped plastic film part, it is also possible to use a suitable adhesive in order to bond the lidding film to the shaped plastic film part. The welding or bonding of the lidding film to the shaped plastic film part takes place preferably directly after filling, thereby ruling out any crosslinking during production of the preferably reactive adhesive, the preferably reactive sealant or the preferably reactive coating material, respectively, with atmospheric moisture, UV radiation or both, for example. This is a key advantage relative to the production of granules of reactive polyurethane hotmelt adhesive, for example, since in that case the granules have first to solidify before they can be packed.

Especially preferred for the welding of the shaped plastic film parts using lidding film is the use of sealing plates which exhibit fluting. By virtue of a sealing structure with fluting, the blister packs can be opened by peeling open the shaped plastic film part and/or the lidding film. With particular preference, sealing plates with a flat sealing surface are used. This produces a firm welding of the lidding film to the shaped plastic film part. The shaped adhesive, coating or sealant article can be withdrawn, for example, by being pressed out through the lidding film. The sealing (welding) of the lidding film to the shaped plastic film part takes place preferably at temperatures of 100-200° C., more preferably at 160-200° C.

Accordingly, in a further preferred embodiment, a blister pack is provided wherein the lidding film has fluting on the side facing away from the at least one cavity.

Typical melt tanks on edge gluing machines have a volume of 350 to 750 ml. For maximum economic efficiency of pack size, the cavities used are especially those having cavity volumes of preferably 5 to 500 ml, more preferably of 10 to 100 ml. In the case of complete occupancy with the shaped adhesive, coating or sealant article, this also corresponds to the filling volume. With regard to the shape of the blister pack there is no limitation. The depth of the blisters is preferably in the range from 2 mm to 50 mm, more preferably in the range from 5 mm to 25 mm.

In the context of the present invention, preference is given to using reactive adhesives, coating materials and sealants that crosslink by atmospheric moisture, temperature exposure, or under UV light, chemically. Examples of reactive adhesives, coating materials and sealants are the reactive polyurethane hotmelt adhesives and reactive polyolefin hotmelt adhesives, UV-curable, acrylate-based hotmelt adhesives and so-called dual-cure hotmelt adhesives known to the skilled person, as known from international patent application WO 2006/106143 A1, which as well as with atmospheric moisture are also able to react with UV light, and other reactive adhesives, coating materials and sealants.

According to the present invention, reactive adhesives, coating materials and sealants are preferred, but it is also possible to use thermoplastic adhesives, coating materials and sealants if they are to be protected from soiling, dust or moisture, for example. Suitable thermoplastic adhesives, coating materials and sealants are those based on ethylene-vinyl acetate, polyolefins, polyesters, polyamides, thermoplastic rubbers, thermoplastic polyurethanes, and other thermoplastics, which are to be protected from the ambient conditions.

The adhesives, coating materials and sealants are preferably solid at room temperature and in the noncrosslinked state preferably have a melting point or softening point of above room temperature, more preferably above 40° C. In the context of the present invention, 24° C. are taken preferably to be room temperature. The adhesives, coating materials and sealants at room temperature are preferably tack-free or have only a low tack, allowing them to be withdrawn easily from the packaging blisters.

The adhesives, coating materials and sealants may comprise fillers and further adjuvants known to the skilled person, such as stabilizers and pigments. The adhesives, coating materials and sealants have a viscosity by the Brookfield method of 2000 mPas to 200 000 mPas, preferably of 10 000 mPas to 100 000 mPas, based on the respective temperature during filling.

A working example of the invention is elucidated with reference to FIGS. 1 to 3, in which.

Figure 1:
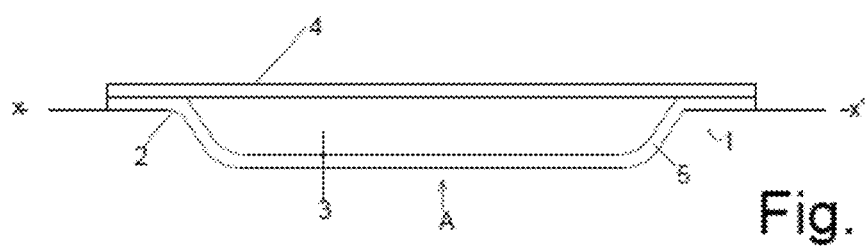
FIG. 1 shows the cross section of a blister pack perpendicular to the lidding foil.

The figures depict a blister pack 1 which exhibits a shaped plastic film part 2, which has a cavity 3 with a cavity wall 5, the shaped plastic film part 2 being joined to a lidding film 4 in such a way that the cavity is closed. Located within the cavity is the shaped adhesive, coating or sealant article (not depicted).

Figure 2:
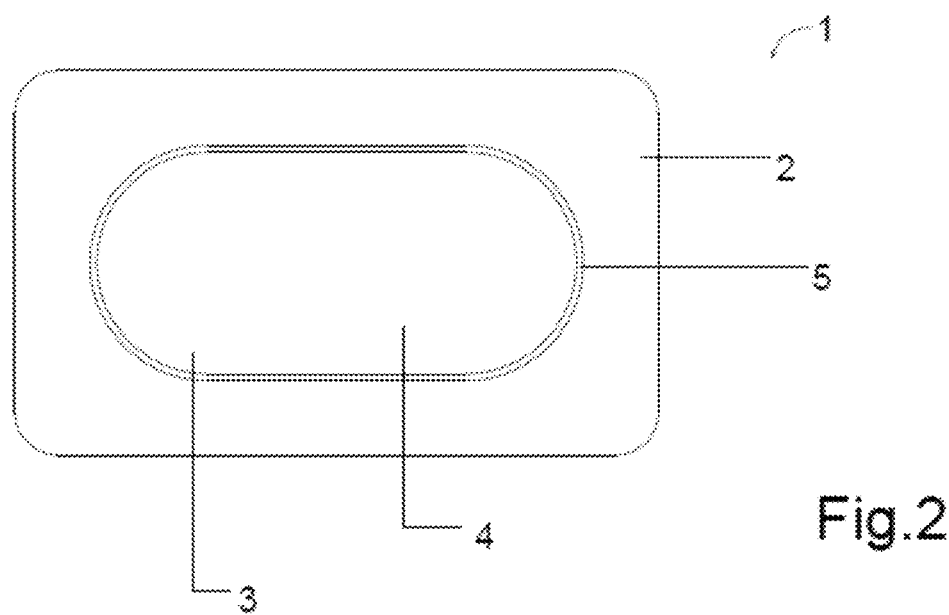
FIG. 2 shows the cross section of a blister pack with an oval cavity cross section, along the plane to the lidding film, at the height of the line XX', as viewed from direction A in FIG. 1.

FIG. 1 shows a cross section of the blister pack 1 perpendicularly to the lidding film, and so the cavity wall is visible. FIG. 2 shows the cross section of the blister pack 1 with oval cavity cross section along the plane to the lidding film at the height of the line XX' as viewed from direction A in FIG. 1. An alternative blister pack 1 in analogy to FIG. 2 comes about through the use of a round cross section rather than an oval cross section to the cavity. The lidding film 4 is visible only in the region of the cavity 3 in FIG. 2, and is otherwise concealed by the shaped plastic film part 2. The shaped adhesive, coating or sealant article is not depicted.

LIST OF REFERENCE NUMERALS (1) Blister pack
(2) Shaped plastic film part
(3) Cavity
(4) Lidding film
(5) Cavity wall

The invention claimed is:

1. A blister pack (1) filled with a shaped adhesive, coating or sealant article that is solid at room temperature, said pack (1) having a shaped plastic film part (2), which has at least one cavity (3), and a lidding film (4), wherein the lidding film (4) closes the cavity (3), characterized in that the at least one cavity (3) has a filling volume with adhesive, coating material or sealant in the range from 5 ml to 500 ml, the adhesive, the coating material or the sealant has a viscosity of 2000 to 200 000 mPas by the Brookfield method at not less than one temperature in a temperature range from 80° C. to 180° C., that shaped plastic film part (2) and the lidding film (4) are adhesively bonded or welded to one another and that the lidding film (4) constitutes an aluminum foil, a metalized composite film, a laminate of aluminum/propylene, or a sealable, $SiO_x$- or $AlO_x$-coated monofilm.

2. The blister pack (1) as claimed in claim 1, characterized in that the adhesive, the coating material or the sealant is a reactive adhesive, a reactive coating material or a reactive sealant.

3. The blister pack (1) as claimed in claim 2, characterized in the reactive adhesive, the reactive coating material or the reactive sealant is crosslinkable by means of atmospheric moisture, thermally and/or under UV light.

4. The blister pack (1) as claimed in claim 1, characterized in that the adhesive, the coating material or the sealant is a moisture-reactive polyurethane hotmelt adhesive, a moisture-reactive polyolefin hotmelt adhesive, a UV-curable acrylate-based hotmelt adhesive or a dual-cure hotmelt adhesive.

5. The blister pack (1) as claimed in claim 1, characterized in that the shaped adhesive, coating or sealant article has a melting or softening point of above 40° C.

6. The blister pack (1) as claimed in claim 1, characterized in that the blister pack (1) has a single cavity (3).

7. The blister pack (1) as claimed in claim 1, characterized in that the shaped plastic film part (2) is formed from a composite film which has at least one plastics layer.

8. The blister pack (1) as claimed in claim 7, characterized in that the composite film comprises an aluminum layer.

9. The blister pack (1) as claimed in claim 8, characterized in that the aluminum-containing composite film comprises layers of polyamide/aluminum/polypropylene.

10. The blister pack (1) as claimed in claim 1, characterized in that the shaped plastic film part (2) has a cavity wall (5) having a thickness in the range from 20 µm to 500 µm.

11. The blister pack (1) as claimed in claim 1, characterized in that the lidding film (4) has a thickness of 10 µm to 200 µm.

12. The blister pack (1) as claimed in claim 1, characterized in that shaped plastic film part (2) and the lidding film (4) are welded by means of a heat-sealing varnish.

13. The blister pack (1) as claimed in claim 1, characterized in that shaped plastic film part (2) and the lidding film (4) are welded by means of a polypropylene film which is part of a laminate with at least the construction aluminum/polypropylene.

14. The blister pack (1) as claimed in claim 1, characterized in that the lidding film (4) has fluting on the side facing away from the at least one cavity (3).

15. The blister pack (1) as claimed in claim 1, characterized in that the filling volume with adhesive, coating material or sealant is in the range from 10 ml to 100 ml.

16. The blister pack (1) as claimed in claim 1, characterized in that the at least one cavity (3) has a volume of which at least 50% is occupied by the filling volume with adhesive, coating material or sealant.

17. The blister pack (1) as claimed in claim 1, characterized in that the at least one cavity (3) has a depth of up to 50 mm.

18. The blister pack (1) as claimed in claim 1, characterized in that the shaped adhesive, coating or sealant article is adapted to the shape of the cavity (3).

19. The blister pack (1) as claimed in claim 1, characterized in that the shaped adhesive, coating or sealant article has the shape of a spherical slice, a hemisphere, a spherical segment, a hemiellipsoid or a half-cylinder or of a half-cylinder rounded off at the ends on both sides.

20. A method for producing a blister pack (1) as claimed in claim 1, comprising the steps of
  (a) filling at least one cavity (3) of a shaped plastic film part (2) with an adhesive, coating material or sealant which is solid at room temperature, and
  (b) joining the shaped plastic film part (2) to a lidding film (4) in order to close the at least one cavity (3), wherein the shaped plastic film part (2) and the lidding film (4) are adhesively bonded or welded to one another.

21. The method as claimed in claim 20, characterized in that the shaped plastic film part (2) was produced by introducing the at least one cavity (3) into a bottom film.

22. The method as claimed in claim 20, characterized in that the filling in step (a) takes place in an inert environment.

23. The method as claimed in claim 20, characterized in that the joining in step (b) takes place by welding or adhesive bonding, preferably by welding using a heat-sealing varnish.

* * * * *